United States Patent
Virtanen

(10) Patent No.: US 6,475,459 B1
(45) Date of Patent: Nov. 5, 2002

(54) PROCESS FOR PREPARING CALCIUM CARBONATE PARTICLES

(75) Inventor: Pentti Virtanen, Toijala (FI)

(73) Assignee: FP-Pigments Oy, Espoo (FI)

( * ) Notice: Subject to any disclaimer, the term of this patent is extended or adjusted under 35 U.S.C. 154(b) by 0 days.

(21) Appl. No.: 09/508,199

(22) PCT Filed: Sep. 8, 1999

(86) PCT No.: PCT/FI98/00701

§ 371 (c)(1),
(2), (4) Date: May 31, 2000

(87) PCT Pub. No.: WO99/12852

PCT Pub. Date: Mar. 18, 1999

(30) Foreign Application Priority Data

Sep. 8, 1997 (FI) .................................................. 973633

(51) Int. Cl.⁷ .................................................. C01F 11/18
(52) U.S. Cl. ....................................................... 423/432
(58) Field of Search ......................................... 423/432

(56) References Cited

U.S. PATENT DOCUMENTS

| 2,081,112 A | | 5/1937 | Statham et al. | |
|---|---|---|---|---|
| 4,237,147 A | * | 12/1980 | Merten et al. | 426/590 |
| 4,714,603 A | * | 12/1987 | Vanderheiden | 423/432 |
| 4,931,264 A | * | 6/1990 | Rochelle et al. | 423/242 |
| 5,494,651 A | * | 2/1996 | Minayoshi et al. | 423/432 |
| 5,558,850 A | * | 9/1996 | Bleakley et al. | 423/432 |

FOREIGN PATENT DOCUMENTS

| EP | 0604095 A1 | 6/1994 |
|---|---|---|
| FI | 964130 | 10/1996 |
| FI | 950411 | 10/1997 |
| FI | 964132 | 6/1999 |
| FI | 971161 | 6/2000 |
| WO | WO8809226 | 12/1988 |
| WO | WO9623728 | 8/1996 |
| WO | 97 11030 | 3/1997 |
| WO | 98 16471 | 4/1998 |
| WO | WO9841475 | 9/1998 |
| WO | WO9951525 | 10/1999 |

* cited by examiner

Primary Examiner—Stanley S. Silverman
Assistant Examiner—Edward M. Johnson
(74) Attorney, Agent, or Firm—Birch, Stewart, Kolasch & Birch, LLP

(57) ABSTRACT

The invention is related to a method for forming calcium carbonate. In the method, calcium oxide is reacted with carbonate ions in the presence of water to produce calcium carbonate. According to the invention, the formation is carried out directly from calcium oxide to calcium carbonate without intermediate stages in a three-phase precipitation, whereby the hydration of the calcium oxide to calcium hydroxide and the carbonation of the hydrated part are carried out immediately after one another under so intensive agitation that the calcium carbonate elements thus created are detached from the surface of the calcium hydroxide. The mixing is preferably carried out in a fluid medium where the amount of gaseous phase is at least 20 parts by volume and the amount of liquid phase is 0.5 to 1 part per one part by volume of the solid matter of the suspension. In the process, the desired end product, PCC, can be prepared in a very short residence time and with a small operational content.

14 Claims, 3 Drawing Sheets

$$CaO + CO_2 + (H_2O) \longrightarrow CaCO_3 + (H_2O)$$

PROCESS FOR PREPARING CALCIUM CARBONATE PARTICLES

This application is the national phase under 35 U.S.C. § 371 of PCT International Application No. PCT/FI98/00701 which has an International filing date of Sep. 8, 1998, which designated the United States of America.

The present invention relates to a method for forming calcium carbonate, comprising a step of reacting a starting material containing calcium oxide with carbonate ions in the presence of water to produce calcium carbonate, and a step of recovering the calcium carbonate, characterized in that the formation is carried out directly from calcium oxide to calcium carbonate without intermediate stages in a three-phase precipitation where calcium oxide is hydrated to calcium hydroxide and the thus formed calcium hydroxide is carbonated to form calcium carbonate attached to a surface of calcium hydroxide particles, wherein the hydration and carbonation are carried out in immediate succession under so intensive agitation that calcium carbonate elements attached to the surface of the calcium hydroxide become detached.

According to this method, a starting material containing calcium oxide is reacted with carbonate ions in the presence of water.

The use of calcium carbonate, precipitated calcium carbonate in particular, is growing in various industries, such as the paper, plastic, and pharmaceutical industries. The intention is to form precipitated calcium carbonate (PCC) into a fine-grained, pure, and as white as possible pigment to be used for various purposes.

Numerous methods are known from before for the manufacture of PCC. Our previous patent application FI 950411 discloses that highly fine-grained PCC pigment can be produced when fine-grained lime hydrate (slaked lime) is used as starting material and crystals are allowed to grow without essentially agitating, and that the reaction can be interrupted at a certain particle size by intensive agitation.

Patent application FI 964132 further improves the said method so that, by observing the viscosity of the thus formed nucleation mass, the correct time to interrupt the growth of particles is determined.

Patent application FI 971161 again discloses how calcium hydroxide is carbonated with carbon dioxide in a mixing device having a high energy density, the energy intensity of the mixing device being higher than 1000 $kW/m^3$ of free space of the mixing zone of the device.

Precipitation of calcium carbonate on the surface of foreign particles is described in published applications EP 0 375 683 and EP 0 604 095, among others.

The present invention is based on the idea that sequential processes, such as hydration of lime or calcium oxide and carbonation of slaked lime are carried out by using high-energy equipment where the high energy intensity inside the device replaces the mere slow diffusion process in liquid and gas. The reactions of the method are further carried out in as high a dry content as possible, whereby it is not necessary to concentrate the end product, for example, by filtering or otherwise, but the end product as such can be used, for example, as filling or coating material for paper.

According to the invention, the formation of calcium carbonate is carried out directly from calcium oxide into calcium carbonate without intermediate stages in a heterogeneous three-phase precipitation. Three-phase precipitation means here that when calcium carbonate is formed, there are present a solid phase (calcium oxide/calcium hydroxide/calcium carbonate), a liquid phase (water and, possibly, the carbonate compounds dissolved in the water), and a gas phase (carbon dioxide in carbonation). The calcium carbonate formed in the precipitation is separated to a different phase (gas phase) from where it was formed (in liquid phase; in other words, with water present). Further growth of the precipitating calcium carbonate elements is prevented because of the lack of a reactant, so that the reaction cannot continue and the growth of the particle size is stopped. In this case, the size of the formed particles can be adjusted by the feeding amount of water: the lesser the water, the smaller the particles.

The hydration of calcium oxide and the carbonation of the hydrated part are carried out immediately after one another and under so intensive agitation that the calcium carbonate elements thus created are separated from the surface of the calcium hydroxide layer. According to the invention, very small particles are instantly produced which immediately agglomerate from the initial particles of about 20 nm, forming aggregates of about 50 nm.

More specifically, the solution according to the invention is formed by the calcium oxide and water being mixed in a fluid containing a gas and a suspension of solid matter and liquid, where the amount of the gas in the fluid is at least 2 parts by volume per one part by volume of the suspension and the amount of the liquid is 1 to 20 parts per one part of solid matter.

The present invention provides considerable advantages. Consequently, the process from raw material to end product takes only a few seconds. The present invention provides a multi-purpose process which, in a new way, combines the functions of previous solutions so that the desired end product, PCC, can be manufactured in a very short residence time and a small operational content. Additionally, it was possible to eliminate intermediate storage from the process and, furthermore, it was observed that highly intensive mixing works best when the dry content of the treated material in proportion to the water is high.

In the present method, calcium carbonate is not precipitated on the surface of foreign particles, as the published applications EP 0 375 683 and EP 0 604 095 disclose. Previous publications concerning the manufacture of PCC do not show that the carbonation is started before the slaking of the lime.

The PCC particle formed as a consequence of the three-phase, heterogeneous precipitation described above is opaque (in other words, it does not give a clear direction to light) and its crystal form is vaterite. This is very well-suited for paper coating because it provides a fairly high opacity. On the other hand, homogeneous precipitation provides a crystalline product the pigment properties of which are not as good.

In the following, the invention is described in detail with reference to the appended drawings.

DETAILED DESCRIPTION OF THE INVENTION

Figure 1:
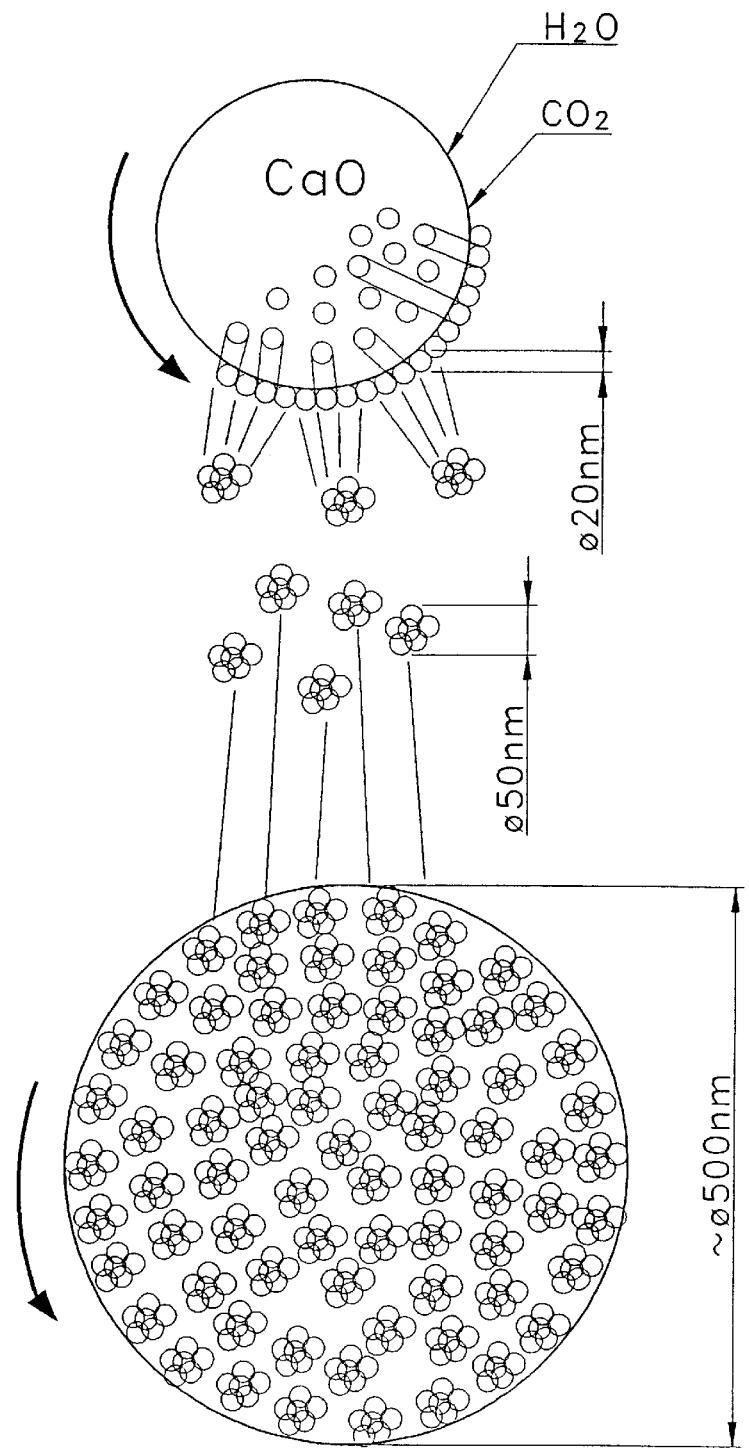
FIG. 1 shows the principle of the generation of the product.

The invention is divided into various embodiments which all have in common the said quick throughput time of the process and the high-intensity mixing process needed for it.

Generally, quick lime and water are mixed in a fluid state in a powerful mixer. In the fluid, the main part is gas that contains solid matter and liquid (dispersion+aerosol). The amount of gaseous phase in the fluid is at least 20 parts by volume per one part by volume of the suspension, and the amount of liquid phase is 1 to 20 parts per solid matter phase. The high-intensity mixing process preferably works in a fluid medium where there are typically present, for example, 5000 to 10000 parts by volume of gas and steam, one part of solid matter, and 0.5 to 1 parts of water, all in volumetric ratios. Treatment in such a fluid does not recognise viscosity limits or other phenomena brought about by it, such as difficult transfers of material in the intermediate phases.

According to the invention, the process can be carried out by the following reactions, for example:

A) $CaO+H_2O+CO_2 \rightarrow CaCO_3+H_2O$
B) $CaO+H_2O+Na_2CO_3 \rightarrow CaCO_3+2\ NaOH$
C) $CaO+H_2O+(NH_4)_2CO_3 \rightarrow CaCO_3+2\ NH_4OH$ According to the invention, in the same connection, coating other pigments can further be carried out by the calcium carbonate thus obtained, whereby the precipitated calcium carbonate particles will not grow together, i.e., precipitate on top of another particle, but the PCC particles that were unhomogeneously and separately formed will root in the surface of another, larger particle in the presence of a turbulence field with a high shearing force.

In embodiment B which is also carried out using a relatively high dry content, the problematic low causticity can be solved according to the present invention so that the uncausticised sodium carbonate is crystallized away from the lye thus formed and returned to the beginning of the process. In alternative B, potassium carbonate and carbonates of other alkali metals can be used instead of sodium carbonate.

According to the invention, new products are provided which are called nano-aggregates with a typical diameter of 50 nm. These aggregates can further be combined to form larger agglomerates of 100 to 500 nm by adjusting the pH to the value of 6.5 to 9.5, as the Finnish patent application FI 964130 teaches.

On a micro level, this can be explained so that calcium hydroxide, for example, is brought to an intensive agitation field together with water, whereby its surface layer begins to hydrate and, as a consequence of the hydration, $Ca(OH)_2$ is obtained which immediately, at the same time, begins to carbonate. The calcium carbonate obtained from the reaction is homogeneous. Namely, very small PCC particles are generated in the carbonation or causticising, correspondingly, onto the surface of the lime particles.

As a consequence of the turbulence produced by the mixing device, impact energy and the heat generated, these particles, however, detach from the surface of the calcium oxide or calcium hydroxide particles. They do not remain independent in the mixer fluid but primary particles quickly combine to form larger particle aggregates or clusters of about 10 to 30, typically about 15 to 20 particles. Their size is about 50 to 100 nm. The aggregates provide agglomerates, i.e., botryoidal bunches that contain about 500–600 aggregates that combine with one another. The size of the agglomerates is about 500 nm. They are fairly strong and endure the turbulence of the reactor. When larger, looser agglomerates are grown, the turbulence is decreased. The formation of these agglomerates can be carried out by adjusting the pH value so that the Z-potential of the particles is as low as possible. The particles can also be used to coat other pigments such as kaolin, chalk, talc or titanium dioxide. The coating can be carried out by feeding the pigments to be coated, in the form of aqueous slurry, for example, to the equipment according to the invention jointly with calcium oxide and carbon dioxide and, as applicable, by adjusting the pH value suitably by using carbonic acid or some other acid (for example, phosphoric acid).

The mechanism for the generation of nano-aggregates and agglomerates is also shown in the appended FIG. 1.

In the second embodiment of the invention, complete particles are brought to the process which particles are coated with small, 10–50 nm PCC particles that were formed (not forming). In this case, when the pigment that is introduced is in the form of an aqueous slurry with a sufficiently high dry content, these particles are evenly coated with separate PCC particles which were not precipitated or generated on the surface of, e.g., the kaolin, but combined with it after they were generated. This difference is easy to detect in electron microscope images, for example.

In practice, the equipment according to the present invention functions so that several high-power mixers/grinders are in series so that they form a cascade in which, at least in the first stage, at least partial hydration of calcium oxide is carried out and, immediately after it or at the same time, the reagent, the carbon dioxide or sodium carbonate or ammonium carbonate causing the carbonation, is introduced, as well as the material that is coated with the thus generated calcium carbonate. Known pigments, such as kaolin, chalk, ground calcium carbonate, precipitated calcium carbonate, talc, titanium dioxide, and mixtures thereof can be coated, their mixture ratios and particle size distributions varying within a wide range.

The whole process, from feeding the calcium oxide into the device and removing the ready product from the device, takes 5 seconds maximum and 0.1 seconds minimum, typically 1.5 to 3 seconds.

As mentioned above, the calcium carbonate particles generated in the process are not crystalline because normal crystallisation cannot take place in such a short onset time. They belong to the class of so-called vaterite, i.e., amorphous calcium carbonate. This amorphousness and the complete round, spherical shape occurring at the same time, as well as very precisely the same particle size distribution mean that the surface energy of each discrete pellet is the same. Therefore, they are stabile in resisting crystallisation and dissolution and, further, crystallisation into a new shape that is thermodynamically more stabile.

Figure 2:
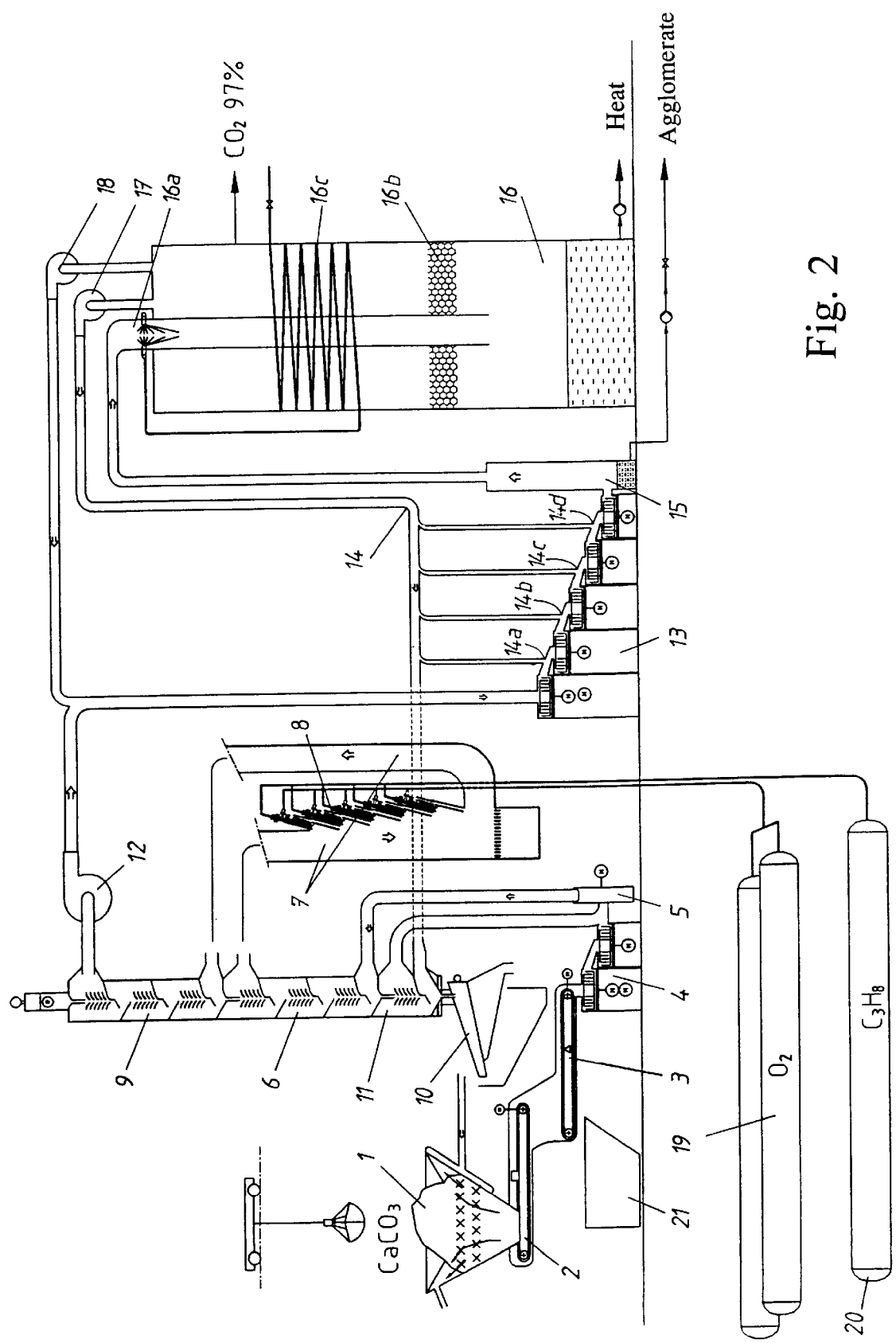
FIG. 2 shows a skeleton diagram of the basic structure of a preferred application of the equipment according to the invention.
Figure 3:
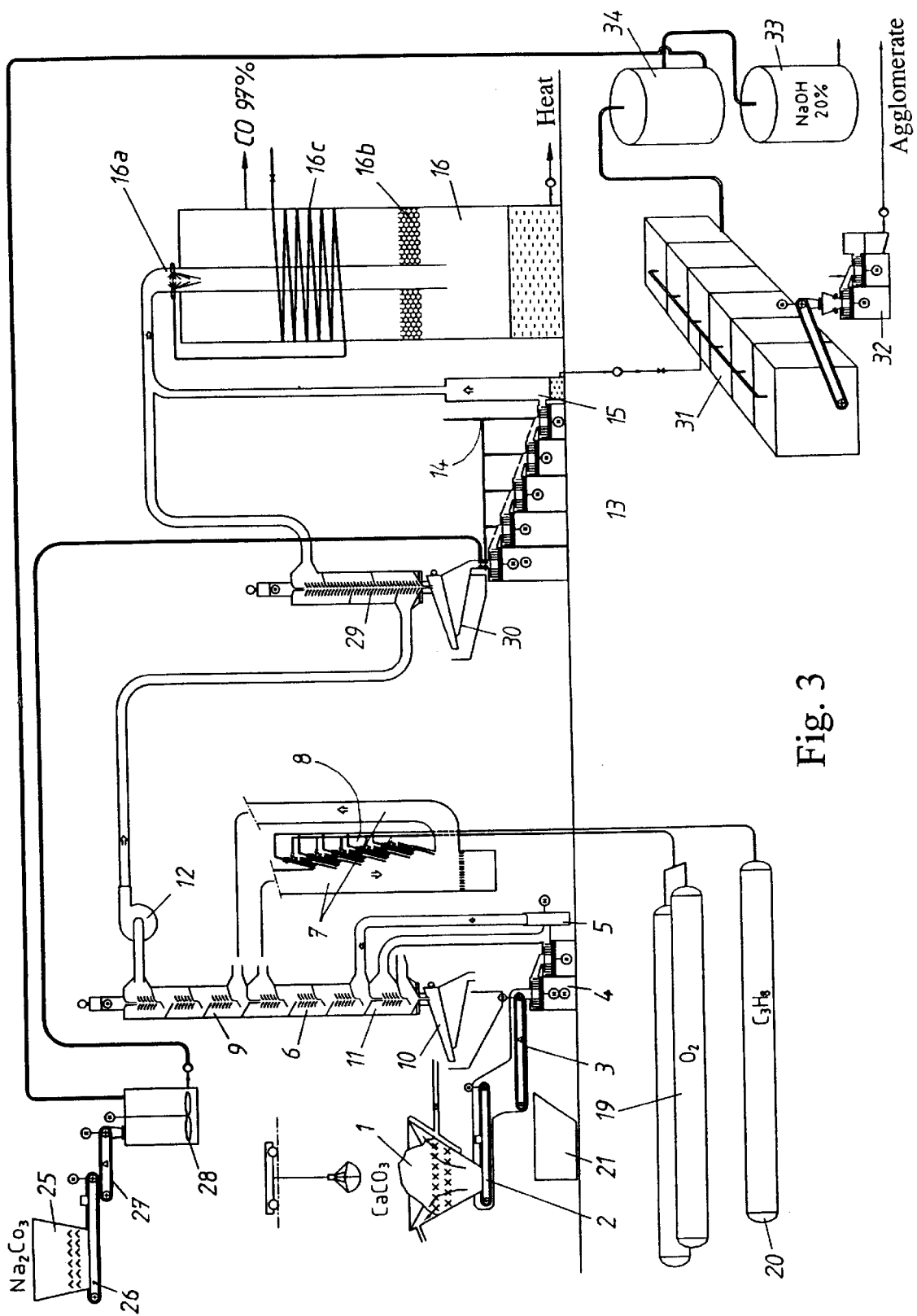
FIG. 3 shows a skeleton diagram of the process application of another preferred embodiment of the invention.

FIGS. 2 and 3 show in detail two alternative process solutions. The following reference numbers are used in the drawings which are shared by FIGS. 2 and 3:

1 Storage funnel for limestone
2 Belt conveyor and metal detector
3 Weighing
4 Grinding of limestone
5 Blower
6 Preheating of ground limestone
7 Flame tubes
8 Main burner
9 Cooling of quick lime and carbon dioxide
10 Equipment for treating the heat carrier
11 After-cooler
12 Blower
13 Carbonation equipment
14 Water for slaking and water for cooling the CaO
15 Separator of PCC
16 Jet condensation system
16a Condensing jet
16b Drop separator 16c Condenser
17 Feeding of additional carbon dioxide
18 Feeding of additional carbon dioxide
19 Molecular sieve
20 Propane container
21 Waste bucket FIG. 3 further shows the following reference numbers:
25 Storage funnel for sodium carbonate
26 Belt conveyor
27 Weighing
28 Dissolution of sodium carbonate
29 Separator for quicklime/circulation gas
30 Equipment for treating the separated material
31 Filter
32 After-treatment of PCC
33 Sodium hydroxide container
34 Soakage There is no circulation of carbon dioxide according to reference numbers 17 and 18 in the application of FIG. 3.

FIG. 1 shows a diagrammatic plan of the production equipment of PCC in which production is based on the carbonation reaction. The equipment comprises a part (reference numbers 1 to 4) where raw material, i.e., limestone is mechanically treated, a burning unit for limestone (reference numbers 5 to 12), a carbonation unit (reference numbers 13 to 15), and recovery and recycling of gases (reference numbers 16 to 18).

The limestone crushed in storage funnel 1 is preheated and, when needed, any snow and ice among the limestone is melted. Belt conveyor 2 transfers the limestone to belt conveyor scale 3. By adjusting the speed of the conveyor the amount of limestone going into the process is adjusted. A metal detector is arranged in connection with the conveyor to detect possible metal objects that are separated and transferred to waste bucket 21 on horizontal belt conveyor 3.

Thereafter, the weighed amount of limestone is fed to grinding 4 where the limestone is ground by a two-step impact pulveriser, whereby limestone powder is obtained, 90% of its particles having a size of less than 90 $\mu$m. The powder is conveyed from grinding 4 to preheater 6 with the aid of blower 5. Additional gas is brought to the suction face of the blower from condensing jet 16.

The powdered limestone is preheated in heat exchanger 6, 9, the limestone being heated in the lower part 6 thereof and the burnt lime (calcium oxide) and the carbon dioxide being cooled in the upper part 9. In the preheater part 6, the hot (800–900° C.) heat transfer material flows down the middle channel of the heat exchanger and the fluidised limestone powder is blown through the bed thus formed in various phases by using the counterflow principle. When arriving at the heat exchanger, the temperature of the fluid is 20–100° C., increasing to about 700° C. in the heat exchanger. At the same time, the temperature of the heat transfer material drops to about 200° C.

Thereafter, the preheated limestone powder is conveyed to burning of limestone 7 where the carbon dioxide is separated from the calcium carbonate so that burnt lime, i.e., calcium oxide is produced according to the following equation: $CaCO_3 \rightarrow CaO+CO_2$. Burning is carried out in fluid tube 7 where the temperature of the particles is increased to about 900–1400° C. by using burners 8. In the burned with oxygen, whereby carbon dioxide and aqueous steam is released through the reaction $C_3H_8+5O_2 \rightarrow 3CO_2+4H_2O$. The propane is taken to burning from propane container 20 and oxygen from oxygen source 19 where it is separated from air by using a molecular sieve to produce pure $O_2$ with a pressure of, for example, 2 bar.

The cold heat transfer material from the preheater part 6 of limestone is cooled with a flow of gas from 200° C. to about 20–100° C. and, at the same time, the fine ingredients are separated by using the equipment for treating the heat transfer material. Cold heat transfer material is used to cool the quicklime and the carbon dioxide in the cooler part 9 of the heat exchanger. In addition, the heat transfer material is regenerated. Consequently, the heat transfer material is conveyed down the middle channel of heat exchanger 6, 9 and the burnt limestone powder is conveyed through the bed thus formed in several phases by using the counterflow principle. When coming to the heat exchanger, the temperature of the fluid from the combustion is 900–1000° C., decreasing in the heat exchanger to about 200° C. At the same time, the temperature of the heat transfer material increases to about 800° C. 1–5 mm crushed limestone can be used as the heat transfer material. The equipment comprises the screening and extra dosage equipment (not shown) for limestone, ascending conveyor 11, and jigger screen 10. Ascending conveyor 11 is used to raise the heat transfer material to the upper part of the heat exchanger from where it flows, in the way described above, down the middle channel to the lower part of heat exchanger 6, 9 and further to jigger screen 10. The jigger screen transfers the heat transfer material to ascending conveyor 11 and separates the fine ingredients.

The heat transfer material is cooled in after-cooler 11 from 200° C. to 100° C. by using a flow of gas and the fine ingredients are separated at the same time.

The burnt limestone powder obtained from the upper part of heat exchanger 6, 9 is conducted to carbonation by using blower 12. In addition, the blower is used to adjust the flow rate in the cooler part 9 of the heat exchanger.

Carbonation equipment 13 comprises five turbulence mixers of the impact pulveriser type which are arranged in series so that they form a set of stages in a cascade. At each stage, the product at that stage can be modified. The process is essentially a parallel flow process where all the reactants move in the same direction. Water is fed to the equipment from aggregate 14. The water that determines the dry content of the product is fed to the desired step of the carbonation equipment. The water used for hydrating and cooling the chalk is fed through the feeding line and spouts 14a to 14e to the inlets of the stages of the carbonation equipment.

The product obtained from carbonation 13, i.e., the precipitated calcium carbonate (PCC) is separated from the fluid gas ($H_2O$ +$CO_2$) in separator 15 which is, for example, a clarifier based on gravity or a separator of the cyclone or the hydrocyclone type.

The fluid gases of carbonation, i.e., water and carbon dioxide, are recovered in jet condensing system 16 comprising condensing jet 16a, drop separator 16b, and condenser 16c. In the condensing jet part 16a, gases are cooled with a water jet and the water vapour is condensed to water. Drop separator 16b prevents the water from ascending as drops to the upper part of the separator and condenser 16c is used to cool the carbon dioxide that goes into circulation. Through pipe 17, the uncondensed gases recovered in the condenser are returned to be used in the process and the condensed water is removed from the bottom of condenser 16. The carbon dioxide that is collected can be conducted, for example, through pipe 17 to carbonation 13 to be used as additional carbonation gas of the 2nd to 5th stage or to heat exchanger 6, 9 to be used as the cleansing blower gas of the heat transfer material and as the carrier gas of limestone. Through pipe 18, additional carbon dioxide is led to the carbonation equipment so that the flow of carbon dioxide can be combined with the fluid of limestone from blower 12 before the first stage of carbonation.

The desired product, i.e., the precipitated calcium carbonate (PCC) is recovered as a PCC slurry or powder having the desired dry content.

The embodiment according to FIG. 3 is largely the same as in FIG. 2. In the embodiment of FIG. 3, however, PCC is formed by making the calcium oxide react with the sodium carbonate. In this case, the carbon dioxide that is obtained from the limestone and the fuel is not used for carbonation but is recovered as concentrated gas (the concentration is over 90%, for example, about 95 to 99% by volume).

FIG. 3 shows storage funnel 25 for soda (i.e., sodium carbonate) from which the soda is fed to belt conveyor 26, and from there to weighing 27 and the soakage of soda 28. The solution thus obtained is fed to causticising equipment 13 in the way described above, preferably in the form of a liquid spray containing fine-grained drops.

Gas is separated from the carbon dioxide/calcium oxide fluid obtained from blower 12 in burnt lime/circulation gas separator 29 of before the causticising equipment. The gas mainly contains carbon dioxide and it is led to condenser 16 from where it is recovered as a rather pure gas (97% by volume). The calcium oxide is treated with jigger screen 30 before feeding to the causticising equipment.

In this embodiment, a slurry is obtained from the formation of PCC, containing PCC that is suspended in sodium hydroxide. Solid matter is separated from the sodium hydroxide by using filtering equipment 31, and the product thus obtained can be further treated with impact pulveriser 32 or corresponding mixing equipment to provide the desired end product. At this stage, acid such as phosphoric acid can be added to the PCC to adjust the pH. A new feed of sodium hydroxide is taken from container 33 from where it is led to dissolving tank 34 where it can be combined with the mother liquor (supernatant) of the filtering and recycled to the soakage of sodium carbonate.

In a cascade of sequential mixing mills shown in FIG. 2 where carbon dioxide or a gas containing carbon dioxide is used as a reagent, we start with burnt lime in a 10% aqueous slurry and result in a 19.6% PCC suspension.

At the intermediate phase of the carbonation, kaolin (or another corresponding pigment) can be fed to provide an end product with a dry content of 65%, containing a coating of 42% PCC particles.

In FIG. 3, the process is carried out by using soda and the mixture of lye and soda thus created is separated by filtering the PCC, and the soda is separated from the lye by crystallising and returned again to the process circulation at the initial stage.

What is claimed is:

1. A method for forming calcium carbonate, comprising
    a step of reacting a starting material containing calcium oxide with carbonate ions in the presence of water to produce calcium carbonate, and
    a step of recovering the calcium carbonate,
    characterized in that the formation is carried out directly from calcium oxide to calcium carbonate without intermediate stages in a three-phase precipitation where calcium oxide is hydrated to calcium hydroxide and the thus formed calcium hydroxide is carbonated to form calcium carbonate attached to a surface of calcium hydroxide particles, wherein the hydration and carbonation are carried out in immediate succession under so intensive agitation that calcium carbonate elements attached to the surface of the calcium hydroxide become detached, the calcium oxide and water being mixed in a fluid containing a gas and a suspension of solid matter and liquid, where the amount of the gas in the fluid is at least 2 parts by volume per one part by volume of the suspension and the amount of the liquid is 1 to 20 parts per one part of solid matter.

2. The method according to claim 1, characterized in that further growth of the calcium carbonate elements separated from the calcium hydroxide is prevented because of a lack of reactant.

3. The method according to claim 1, characterized in that the carbonation is carried out by using a gas containing carbon dioxide.

4. The method according to claim 1, characterized in that the carbonation is carried out by using sodium carbonate, potassium carbonate or ammonium carbonate.

5. The method according to claim 1, characterized in that the reacting step and the recovering step are both performed in up to 5 seconds.

6. The method according to claim 1, further comprising feeding the recovered calcium carbonate into a coating mixer to coat the calcium carbonate onto a carrier pigment.

7. The method according to claim 6, characterized in that the carrier pigment to be coated is kaolin, chalk, ground calcium carbonate, precipitated calcium carbonate, talc, titanium oxide or a mixture thereof.

8. The method according to claim 6, further comprising feeding a carbonizing ingredient into a mixing device and feeding the carrier pigment into a mixing device which is downstream from the carbonizing ingredient containing mixing device.

9. The method according to claim 1, wherein the method does not include a step of concentrating the produced calcium carbonate.

10. The method according to claim 1, wherein the calcium oxide and water are mixed in a fluid containing 5000 to 1000 parts of gas and steam, one part of solid matter, and 0.5 to 1 parts of water, all in volumetric ratios.

11. A method for forming calcium carbonate, comprising
    reacting a starting material containing calcium oxide with carbonate ions in the presence of water to produce calcium carbonate, and
    recovering the calcium carbonate, characterized in that
    the formation is carried out directly from calcium oxide to calcium carbonate without intermediate stages in a three-phase precipitation where calcium oxide is hydrated to calcium hydroxide and the thus formed calcium hydroxide is carbonated to form calcium carbonate which may attach to a surface of calcium hydroxide particles, wherein the hydration and carbonation are carried out in immediate succession under so intensive agitation that calcium carbonate elements attached to the surface of the calcium hydroxide become detached, and
    the intense agitation is carried out in a fluid medium having a gaseous phase of at least 20 parts by volume per one part by volume of solid matter, and a liquid phase of 0.5 to 1 part by volume of the solid matter.

12. The method according to claim 11, wherein the gaseous phase is 100 to 2000 parts per one part by volume of the solid matter.

13. The method according to claim 11, wherein the method does not include a step of concentrating the produced calcium carbonate.

14. The method according to claim 11, wherein the calcium oxide and water are mixed in a fluid containing 5000 to 1000 parts of gas and steam, one part of solid matter, and 0.5 to 1 parts of water, all in volumetric ratios.

* * * * *